United States Patent
Nash

(10) Patent No.: US 8,533,683 B2
(45) Date of Patent: Sep. 10, 2013

(54) STACK WALKING ENHANCEMENTS USING SENSORPOINTS

(75) Inventor: Brian Nash, Swindon (GB)

(73) Assignee: Wind River Systems, Inc., Alameda, CA (US)

( * ) Notice: Subject to any disclaimer, the term of this patent is extended or adjusted under 35 U.S.C. 154(b) by 1606 days.

(21) Appl. No.: 11/872,348

(22) Filed: Oct. 15, 2007

(65) Prior Publication Data

US 2009/0100413 A1 Apr. 16, 2009

(51) Int. Cl.
 *G06F 9/44* (2006.01)
(52) U.S. Cl.
 USPC ............ 717/128; 717/124; 717/127; 717/130
(58) Field of Classification Search
 None
 See application file for complete search history.

(56) References Cited

U.S. PATENT DOCUMENTS

| | | | | |
|---|---|---|---|---|
| 6,523,141 B1 * | 2/2003 | Cantrill | | 714/48 |
| 6,651,243 B1 * | 11/2003 | Berry et al. | | 717/130 |
| 7,350,196 B1 * | 3/2008 | Cantrill | | 717/128 |
| 7,526,754 B2 * | 4/2009 | Bentolila | | 717/124 |
| 7,568,185 B1 * | 7/2009 | Shapiro et al. | | 717/130 |
| 7,685,573 B2 * | 3/2010 | Kang et al. | | 717/128 |
| 7,712,082 B2 * | 5/2010 | Broman et al. | | 717/127 |
| 7,757,215 B1 * | 7/2010 | Zhou et al. | | 717/124 |
| 8,108,839 B2 * | 1/2012 | Clark | | 717/128 |
| 8,261,244 B2 * | 9/2012 | Pietrek | | 717/130 |
| 2004/0078540 A1 * | 4/2004 | Cirne et al. | | 711/170 |
| 2004/0163077 A1 * | 8/2004 | Dimpsey et al. | | 717/130 |
| 2004/0172219 A1 * | 9/2004 | Curry, III | | 702/186 |
| 2005/0210454 A1 * | 9/2005 | DeWitt et al. | | 717/133 |
| 2008/0244531 A1 * | 10/2008 | Schmelter et al. | | 717/128 |

OTHER PUBLICATIONS

Marcus Bortel, Wind River Device Software Optimization Workbench2.5/VxWorks6.3, Dec. 2005, 84 pages, <http://www-mks2.desy.de/mksgroup/mks2/content/e758/DESY_WB_VxWork.pdf>.*

E. Corry, Optimistic stack allocation for java-like languages, Jun. 2006, 12 pages.*

Arnold et al., Stack Trace Analysis for Large Scale Debugging, 2006, 15 pages.*

* cited by examiner

*Primary Examiner* — Thuy Dao
(74) *Attorney, Agent, or Firm* — Fay Kaplun & Marcin, LLP

(57) ABSTRACT

A system and method for receiving an image of compiled user code, scanning the image to determine each of a plurality of functions included in the user code and creating a separately compiled executable module corresponding to selected ones of the plurality of functions, wherein the module includes instructions to create a stack trace for the selected ones of the functions.

16 Claims, 2 Drawing Sheets

STACK WALKING ENHANCEMENTS USING SENSORPOINTS

BACKGROUND

Stack walking is a common technique used by software developers to debug code. Stack walking involves examining a report of stack frames that have been active during the execution of a program to determine where an error occurs, so that debugging may proceed with a focus on the proper areas of the code. However, traditional stack walking methods are at times unreliable, failing to properly function for some functions or for some CPU architectures. Further, standard stack walking methods fail to provide all data that might be useful for a software developer to be able to access.

SUMMARY OF THE INVENTION

A method for receiving an image of compiled user code, scanning the image to determine each of a plurality of functions included in the user code and creating a separately compiled executable module corresponding to selected ones of the plurality of functions, wherein the module includes instructions to create a stack trace for the selected ones of the functions.

A system having a target device and a host in networked communication with the one or more target devices. The host is configured to receive an image of compiled user code, scan the image to determine each of a plurality of functions included in the user code and create a separately compiled executable module corresponding to selected ones of the plurality of functions, wherein the module includes instructions to create a stack trace for the selected ones of the functions.

DETAILED DESCRIPTION

Figure 1:
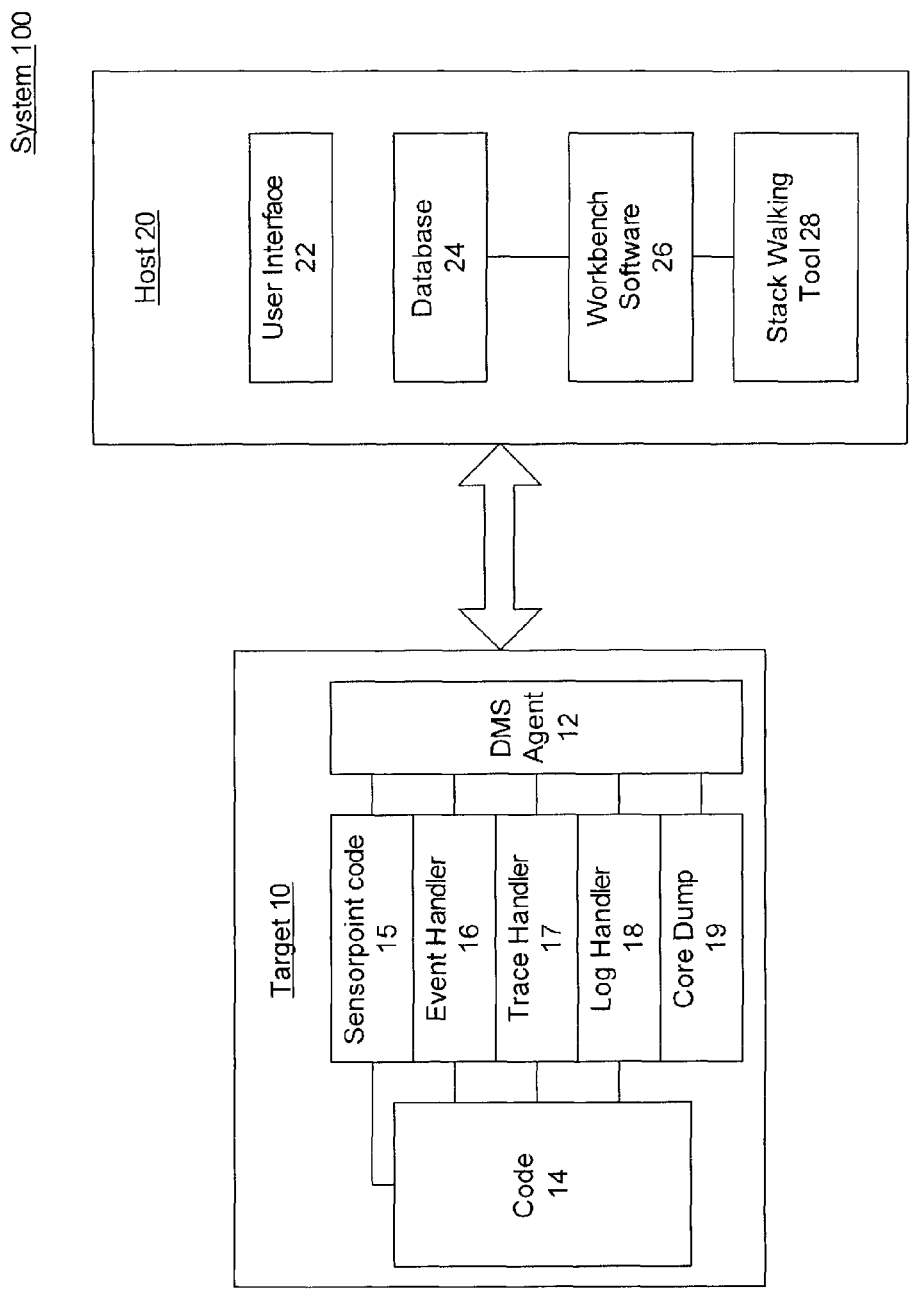
FIG. 1 shows an exemplary embodiment of a system for using sensor points to augment stack walking according to the present invention.

The exemplary embodiments of the present invention may be further understood with reference to the following description and the appended drawings, wherein like elements are referred to with the same reference numerals. The exemplary embodiments of the present invention describe an improved stack walking method, and system for its implementation, to enable more effective and efficient debugging of code that is being developed. According to the exemplary embodiments of the present invention, sensorpoints are used to supplement the information available with standard stack walking. The use of these sensorpoints will be discussed in more detail below.

Stack walking is one common technique used to debug code that is being developed. Those of skill in the art will understand that stack walking may also be referred to as stack tracing or stack backtracing; however, the term "stack walking" will be used throughout the following disclosure to refer to this process. Additionally, the term "stack trace" will be used to describe the output of a stack walk.

Stack walking refers to the generation of a report of active stack frames created by the execution of a program. This may take place anywhere within a program, but is typically done to aid debugging by showing exactly where an error occurs. The last few stack frames often indicate the origin of the error. However, existing stack walking is unreliable on certain types of central processing units ("CPU"); for example, advanced RISC machine ("ARM") CPUs do not include compilers that generate a stack frame that can be walked at runtime. Further, while existing stack walking provides the identities of functions that are called, it fails to provide the parameters with which those functions were called.

The exemplary embodiments of the present invention use what are known as "sensorpoints" to improve the stack walking process. Sensorpoints are segments of compiled code that a developer may implement within target compiled code to provide monitoring data about the target code. Sensorpoints will be described in more detail below.

FIG. 1 shows an exemplary system 100 according to the present invention. The system 100 includes a target device 10 and a host 20. In one exemplary embodiment, both the target 10 and the host 20 may be located in a lab environment, while in another exemplary embodiment, the target 10 and/or the host 20 may be in a field environment. For example, the target 10 may be deployed in a warehouse, office, etc., while the host resides in a laboratory or central server location. The target 10 and the host 20 may include conventional computing components such as a processor (e.g., a microprocessor, an embedded controller, etc.) and a memory (e.g., Random Access Memory, Read-only Memory, a hard disk, etc.). Communication between the target 10 and the host 20 occurs over a communication link, which may be a wired (e.g., Ethernet, serial port, Universal Serial Bus, etc.) or wireless (e.g., Bluetooth, IEEE 802.1x, etc.) connection. It should be noted that while FIG. 1 illustrates an exemplary system including one target device 10, in other exemplary embodiments the host 20 may be in communication with two or more target devices.

The host 20 may include a user interface 22, a database 24, workbench software 26 and a stack walking tool 28. The user interface 22 enables a user (e.g., a software developer) to interact with the host 20 by receiving instructions and data requests. Through the user interface 22, the user may instruct the host 20 to transmit data to and/or from the target 10. The data may include sensorpoint modules and monitoring data. As will be discussed in detail below, sensorpoint modules comprise program code that the developer can implement on the target 10. Monitoring data may include any relevant data that the developer wishes to receive from the target 10, such as device information, alarms and error messages, data logs, and audit information (e.g., information related to users modifying devices and/or sensorpoint modules). The monitoring data may also relate to device type. For example, if the target 10 is a cell phone, the monitoring data may include call usage information, signal strength information, etc. The monitoring data may be transmitted automatically (e.g., at predetermined intervals) or upon request by the developer. For example, the developer may request to view a log file generated by the target 10 in order to view specific program output.

The workbench software 26 is a software development tool used by the developer to create, modify, debug and test software programs. The workbench software may comprise a software suite that includes any number of individual software development programs, such as a compiler, a debugger, a source code analyzer, a text editor, etc. These individual programs may either be run independently or within a main development program. Using the workbench software 26, the developer may create a sensorpoint module, write code for the sensorpoint module, compile the code and save it to the database 24. Once the sensorpoint module is saved, it may be selected for transmission to the target 10. Those skilled in the art will understand that the sensorpoint code as written may not be the same as the actual code executed by the target 10. For example, the actual code may be an executable binary file created as a result of compiling and linking the sensorpoint code. The binary may be included in the sensorpoint module as an object file. In addition, the sensorpoint module may include multiple files, such as source, header and library files. These files may be installed individually or together with the entire sensorpoint module. Additionally, those skilled in the art will understand that while sensorpoint modules may be created by a user using the workbench software 26, such modules may be created using other methods, such as described below.

The database 24 stores sensorpoint modules, monitoring data and other types of data specified by the developer. The database 24 may also include user information, customer information, information regarding the target 10 (e.g., device type), etc. The database 24 may be organized in any number of ways, including separate data structures for holding information corresponding to a specific target, a specific data type (e.g., sensorpoint modules), etc. The database 24 also allows for sensorpoint modules to be grouped together according to the specifications of the developer. For example, the developer may wish to group sub-components of a larger program together. The database 24 is located on a writable memory, and may be accessed via the user interface 22.

The target 10 may include a Device Software Management ("DSM") agent 12 that communicates with the host 20 via the communication link. The DSM agent 12 coordinates the sending and receiving of data. Instructions and data requests are received by the DSM agent 12 and processed accordingly. When data is transmitted or received, the DSM agent 12 may first place the data into a buffer. For example, received sensorpoint modules may be temporarily stored in a buffer before writing to the memory of the target 10. Likewise, data to be transmitted to the host 20 may first be placed in a buffer and sent when the data is ready for transmission and/or the host 20 is ready to receive the data. The DSM agent 12 may be implemented in hardware, software, or a combination thereof.

The target 10 operates using a user code 14, which comprises a program running in an operating system or a standalone program. The user code 14 may be written in any programming language (e.g., C/C++, Assembly language, etc.). The user code 14 may be any program that the developer wishes to run on the target 10. For example, the user code 14 may be a main program or subroutine being developed for implementation on the target 10. The user code 14 may include source, header, library, object, and other data files.

The target 10 may also include sensorpoint code 15. Similar to the user code 14, the sensorpoint code 15 may include source, header, library and object files. According to the exemplary embodiments of the present invention described herein, a sensorpoint is defined as a piece of code that is compiled independently of a running application (e.g., the compiled user code 14) and executed by the running application via branch instructions or exception instructions inserted into the running application (e.g., the executable binary). For example, the sensorpoint code 15 may be written in the C programming language, compiled and linked on the host 20, saved as a sensorpoint module in the database 24, and transmitted to the target 10 for execution. Branch instructions are inserted into a specific location or locations (i.e., instrumentation points) within the user code 14 as desired by the developer, and may also be transmitted from the host 20 as part of the sensorpoint module. In other embodiments, the sensorpoint code 15 may be written and the instrumentation points specified through a user interface located on the target 10 itself. The branch instructions may be inserted by patching the running user code 14 with precompiled branch instructions pointing to the sensorpoint code 15. When the application reaches the instrumentation point(s), the sensorpoint code 15 is run before execution of the user code 14 resumes. In another exemplary embodiment, an instruction that will case an exception is used. Then, in the exception handler, the return program flow is redirected to be the entry of the sensorpoint.

Thus, the developer may debug and develop the user code 14 without having to recompile or interrupt the execution of the user code 14. In addition, the developer may retrieve any type of information that is stored or created by the running user code 14 (e.g., register values, memory usage statistics, collected process data, etc.) without interrupting the user code 14.

The target 10 may also include an event handler 16, a trace handler 17, a log handler 18 and a core dump 19. The event handler 16 responds to events encountered during execution of the user code 14. The events may be user-created (e.g., a mouse click, a menu selection, etc.) or program generated (e.g., a program exception, a software interrupt, etc.). The trace handler 17 stores trace information specified by the user code 14. For example, the trace information may include all read and write instructions, along with corresponding data values and variable names. The trace handler 17 works in conjunction with the log handler 18 to store the trace information into one or more log files, which may then be outputted (e.g., displayed at the target 10 or transmitted to the host 20) for viewing. Using the log handler 17, the developer can specify where log files and what types of information (e.g., reads/writes, error messages, etc.) should be stored. The core dump 19 handles program crashes by providing a log for specific memory contents, which can be viewed after the program crashes.

Figure 2:
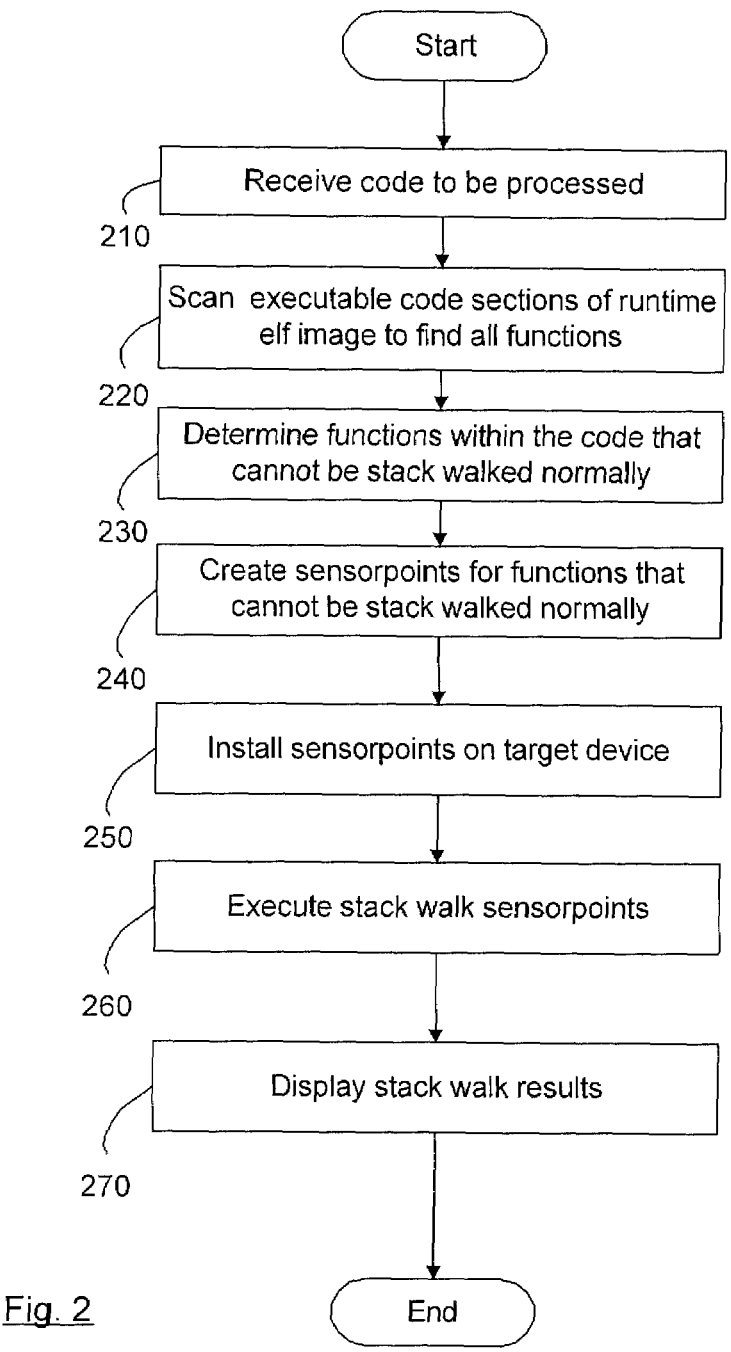
FIG. 2 shows an exemplary embodiment of a method for creating and using sensor points to augment stack walking according to the present invention.

FIG. 2 shows an exemplary method 200 according to the present invention. Other than an initial command from a user to begin this method, the steps of method 200 are performed by the stack walking tool 28 unless otherwise noted. In step 210, the stack walking tool 28 receives code to be processed (e.g., typically the user code 14). The code received may typically be code that, as described above, cannot be stack walked using standard methods. For example, the method 200 may be applied to those functions in the code that cannot be walked at runtime. In one exemplary embodiment, the received code may be the runtime executable and linkable format (hereinafter "ELF") image of the user code 14.

In step 220, the executable code sections of the received code is scanned to find all functions contained in the code. Those skilled in the art will understand that the runtime ELF image may include such a text section. The scanning may typically be performed using a stored procedure (e.g., nm) to obtain the complete function list. In step 230, the stack walking tool 28 determines which functions can be walked and which cannot. Those skilled in the art will understand that all the functions in the user code 14 may be instrumented with sensorpoints to perform the stack walking functions. However, since some functions may be stack walked using conventional techniques, walking these functions using sensorpoints would provide duplicative data and add unnecessary overhead and execution time. Thus, in this exemplary embodiment, the functions that can be stack walked normally are eliminated from the sensorpoint stack walk.

Once this determination is made, the stack walking tool 28 creates sensorpoints for those functions that cannot be stack walked normally (step 240). It should be noted that the sensorpoints may be of any type that may be created using the workbench software 26; the specific type of sensorpoint to be used may be created specifically for this task or it may be of a type that already resides in the database 24. That is, the stack walking tool 28 may include functionality to generate sensorpoints on an as-needed basis or a set of template sensorpoints may be stored in the database 24 and selected as needed.

In step 250, the sensorpoint module is installed by transmitting it to the target 10. The DSM agent 12 receives the sensorpoint module, saves it into memory allocated to the sensorpoint code 15, processes the executable binary and updates the user code 14 with the branch instructions. During this time, the target 10 continues to execute the user code 14 and does not encounter any interruption during running of the user code 14. If the user code 14 encounters the breakpoint(s) during execution, program execution is temporarily suspended in order to allow the sensorpoint program to execute (step 260).

As described above, the sensorpoint is compiled code that is executed by the processor when the processor encounters a break point in the compiled user code. Upon completion of execution of the sensorpoint code, the processor continues to execute the user code, thereby not requiring the user code to be recompiled to execute the code in the sensorpoint. In this exemplary embodiment, the sensorpoint is executed on entry into the function that will be stack walked. While executing, the sensorpoint for the function creates and maintains its own stack (e.g., one per OS task), by pushing information onto the stack. In one exemplary embodiment, the sensorpoints may save complete CPU context information; in another, the sensorpoints may save only a subset of the CPU context information.

Thus, in step 270, the stack walking tool 28 may simultaneously display the stacks generated by the normal compiler/debugger (e.g. the stacks for those functions that can be generated during runtime) and the stacks generated by the sensorpoints (e.g., the stacks for those functions that cannot be generated during runtime using a normal compiler/debugger). By viewing these stacks in parallel, the developer will have a reliable stack walk for the entirety of the program.

Further, the exemplary embodiments of the present invention provide more information than previously existing stack walking techniques. These stack walking techniques would only provide a software developer with the identities of functions that were called, without the parameters with which they were called; knowledge of these parameters can be vital when debugging programs, both during runtime stack walking and during host debugger stack walking. Many CPUs pass parameters in registers; as a result, these parameters are overwritten and cannot later be displayed. While host debuggers can display function parameters that are passed on the stack, these values may change. Using the exemplary embodiments of the present invention, function parameters may be saved on the sensorpoint logging stack. By doing so, the data may be more dynamic and may be read only when a certain condition is met (i.e., at the time of the stack walk); in contrast, using previously existing stack trace tools, this data would be saved to a log buffer every time the function is called and would always be read. The sensorpoint logging stack may be maintained in parallel with the currently executing thread (e.g., the sensorpoint logging stack grows and shrinks with the currently executing thread).

To interpret the sensorpoint logging stack data on the host, an XML description of the data may be generated by the sensorpoint compiler. The XML data is used once the logged information is uploaded from the target, thus it is not used by the target directly. This provides an efficient way to visualize the stack trace by minimizing the impact on the running target.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, executed by a central processing unit (CPU), comprising:
   receiving an image of compiled user code;
   scanning the image to determine each of a plurality of functions included in the compiled user code;
   identifying selected ones of the plurality of functions that cannot be used to generate a report of active stack frames using a normal compiler/debugger during execution of the compiled user code;
   creating a separately compiled executable module corresponding to the selected ones of the plurality of functions, wherein the separately compiled executable module includes instructions to create a stack trace for the selected ones of the functions;
   receiving further stack traces from functions not included in the selected ones of the plurality of functions; and
   displaying the further stack traces to the user.

2. The method of claim 1, further comprising:
   storing the modules; and
   sending the modules to a target device including the compiled user code.

3. The method of claim 1, further comprising:
   receiving the stack traces from the modules that are loaded onto a target device; and
   displaying the stack traces to a user.

4. The method of claim 1, wherein the stack trace includes only a portion of context information for a CPU executing the corresponding function.

5. The method of claim 4, wherein the portion of the context information is the entire context information.

6. The method of claim 1, wherein the image is an executable and linkable format (ELF) image of the compiled user code.

7. The method of claim 1, wherein the scanning includes searching a text portion of the image.

8. The method of claim 1, wherein the stack trace includes function parameters corresponding to the selected ones of the functions.

9. A system comprising:
   a target device; and
   a host in networked communication with the target device, wherein the host is configured to:
   receive an image of compiled user code;
   scan the image to determine each of a plurality of functions included in the compiled user code;
   identify selected ones of the plurality of functions that cannot be used to generate a report of active stack frames using a normal compiler/debugger during execution of the compiled user code;
   create a separately compiled executable module corresponding to the selected ones of the plurality of functions, wherein the separately compiled executable module includes instructions to create a stack trace for the selected ones of the functions;
   receive further stack traces from functions not included in the selected ones of the plurality of functions; and
   display the further stack traces to the user.

10. The system of claim 9, wherein the host is further configured to:
   store the modules; and
   send the modules to a target device including the compiled user code.

11. The system of claim 9, wherein the host is further configured to:
   receive the stack traces from the modules that are loaded onto a target device; and
   display the stack traces to a user.

12. The system of claim 9, wherein the stack trace includes only a portion of context information for a CPU executing the corresponding function.

13. The system of claim 12, wherein the portion of the context information is the entire context information.

14. The system of claim 9, wherein the scanning includes searching a text portion of the image.

15. The system of claim 9, wherein the stack trace includes function parameters corresponding to the selected ones of the functions.

16. A non-transitory computer readable storage medium including a set of instructions executable by a processor, the set of instructions, when executed by the processor, causing the processor to:
   receive an image of compiled user code;
   scan the image to determine each of a plurality of functions included in the compiled user code;
   identify selected ones of the plurality of functions that cannot be used to generate a report of active stack frames using a normal compiler/debugger during execution of the compiled user code;
   create a separately compiled executable module corresponding to the selected ones of the plurality of functions, wherein the separately compiled executable module includes instructions to create a stack trace for the selected ones of the functions;
   receive further stack traces from functions not included in the selected ones of the plurality of functions; and
   display the further stack traces to the user.

\* \* \* \* \*